US012518752B2

(12) United States Patent
Tahara

(10) Patent No.: US 12,518,752 B2
(45) Date of Patent: Jan. 6, 2026

(54) INFORMATION PROCESSING METHOD, RECORDING MEDIUM, AND INFORMATION PROCESSING DEVICE

(71) Applicant: Panasonic Intellectual Property Management Co., Ltd., Osaka (JP)

(72) Inventor: Kohei Tahara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 345 days.

(21) Appl. No.: 17/634,607

(22) PCT Filed: Jan. 22, 2021

(86) PCT No.: PCT/JP2021/002293
§ 371 (c)(1),
(2) Date: Feb. 11, 2022

(87) PCT Pub. No.: WO2021/171851
PCT Pub. Date: Sep. 2, 2021

(65) Prior Publication Data
US 2022/0328042 A1    Oct. 13, 2022

(30) Foreign Application Priority Data
Feb. 27, 2020 (JP) .................. 2020-031427

(51) Int. Cl.
*G10L 15/22* (2006.01)
*G06F 3/16* (2006.01)
(Continued)

(52) U.S. Cl.
CPC ................ *G10L 15/22* (2013.01); *G06F 3/16* (2013.01); *G06F 40/30* (2020.01); *G06F 40/56* (2020.01); *G10L 15/183* (2013.01)

(58) Field of Classification Search
CPC ........ G10L 15/22; G10L 15/183; G06F 40/56; G06F 40/30; G06F 3/16
See application file for complete search history.

(56) References Cited

U.S. PATENT DOCUMENTS 9,489,171 B2 * 11/2016 Klein ................... G10L 15/22
9,576,575 B2 *  2/2017 Heide .................. G10L 15/22
(Continued)

FOREIGN PATENT DOCUMENTS

JP    2017-162273 A    9/2017
JP    2017-162719 A    9/2017

OTHER PUBLICATIONS

International Search Report issued on Apr. 27, 2021 in International Patent Application No. PCT/JP2021/002293, with English translation.

*Primary Examiner* — Daniel C Washburn
*Assistant Examiner* — James Boggs
(74) *Attorney, Agent, or Firm* — Rimon P.C.

(57) ABSTRACT

An information processing method executed by a computer includes: obtaining first sound data from voice of a user for controlling a device; recognizing a phrase indicated by the first sound data obtained; determining first control information of the device corresponding to the phrase recognized; controlling the device according to the first control information determined; and presenting a proposal using voice when second sound data is obtained from voice of the user after the first sound data is obtained, the proposal pertaining to a shortcut for controlling the device according to the first control information.

11 Claims, 16 Drawing Sheets

(51) Int. Cl.
  *G06F 40/30*  (2020.01)
  *G06F 40/56*  (2020.01)
  *G10L 15/183*  (2013.01)

(56) References Cited

U.S. PATENT DOCUMENTS

| | | | | |
|---|---|---|---|---|
| 9,582,246 | B2* | 2/2017 | Klein | H04N 21/4222 |
| 10,031,722 | B1* | 7/2018 | Mutagi | G10L 17/22 |
| 10,496,705 | B1* | 12/2019 | Irani | G06F 16/90328 |
| 10,679,619 | B2* | 6/2020 | Subhojit | G10L 15/065 |
| 11,076,039 | B2* | 7/2021 | Weinstein | H04M 1/72403 |
| 11,188,298 | B2* | 11/2021 | Lee | G06F 9/4843 |
| 11,237,696 | B2* | 2/2022 | Carbune | G06Q 50/12 |
| 11,237,797 | B2* | 2/2022 | Blatz | G06F 9/451 |
| 11,360,739 | B2* | 6/2022 | Blatz | G06F 3/048 |
| 11,450,314 | B2* | 9/2022 | Ni | G10L 15/30 |
| 11,514,908 | B2* | 11/2022 | Choi | G06F 3/167 |
| 11,615,788 | B2* | 3/2023 | Oh | G06F 3/0484 |
| | | | | 704/275 |
| 12,067,980 | B2* | 8/2024 | Lee | G10L 15/22 |
| 2017/0265285 | A1 | 9/2017 | Ueno et al. | |
| 2018/0357547 | A1 | 12/2018 | Yamada | |
| 2022/0046310 | A1* | 2/2022 | Shin | H04N 21/42203 |

* cited by examiner

FIG. 3

| Time | Device ID | Pre-change state | Post-change state |
|---|---|---|---|
| 2019/6/28 08:00 | Bedroom air conditioner | ON/Cool/23 degrees | OFF |
| 2019/6/28 08:01 | Bedroom light | ON | OFF |
| 2019/6/28 08:02 | Living room air conditioner | ON/Cool/23 degrees | OFF |
| 2019/6/28 08:06 | Living room light | ON | OFF |
| 2019/6/28 08:07 | Living room vacuum cleaner | Stopped | Cleaning |
| 2019/6/28 08:10 | Kitchen light | ON | OFF |
| 2019/6/28 10:00 | Living room vacuum cleaner | Cleaning | Stopped |
| ... | ... | ... | ... |

FIG. 4

| | Device state | | | | | | | Completion time |
|---|---|---|---|---|---|---|---|---|
| | Living room | | | Bedroom | | Kitchen | Entrance | |
| | Air conditioner | Light | Vacuum cleaner | Air conditioner | Light | Light | Light | |
| Pre-change state | ON/Cool/23 degrees C | ON | Stopped | ON/Cool/23 degrees C | ON | ON | ON | 2019/6/28 08:10 |
| Post-change state | OFF | OFF | Cleaning | OFF | OFF | OFF | OFF | |

| Command content | | | | | | | State | Phrase | Creation date/time |
|---|---|---|---|---|---|---|---|---|---|
| Living room: valid | | Bedroom: valid | | Kitchen: valid | Entrance: invalid | | | | |
| Air conditioner | Light | Vacuum cleaner | Air conditioner | Light | Light | Light | Unproposed | Undecided | 2019/6/28 08:10 |
| OFF | OFF | START | OFF | OFF | OFF | (No command) | | | |

61

→ Registration proposal

FIG. 6

Living room air conditioner

| Pre-change state | Post-change state | Command |
|---|---|---|
| ON | OFF | OFF |

Living room light

| Pre-change state | Post-change state | Command |
|---|---|---|
| ON | OFF | OFF |

Living room vacuum cleaner

| Pre-change state | Post-change state | Command |
|---|---|---|
| Stopped | Cleaning | START |

FIG. 7

| Command content | | | | | | | State | Phrase | Creation date/time |
|---|---|---|---|---|---|---|---|---|---|
| Living room: valid | | Bedroom: valid | | Kitchen: valid | Entrance: invalid | | Valid | I'm leaving | 2019/6/28 08:10 |
| Air conditioner | Light | Vacuum cleaner | Air conditioner | Light | Light | Light | | | |
| OFF | OFF | START | OFF | OFF | OFF | (No command) | | | |

| Time | Device ID | Pre-change state | Post-change state |
|---|---|---|---|
| 2019/10/7 19:00 | (Execute shortcut S2) | (omitted) | (omitted) |
| 2019/10/7 19:00 | Bedroom air conditioner | ON | OFF |
| 2019/10/7 19:02 | Living room air conditioner | ON | OFF |
| ... | ... | ... | ... |

71, 72, 73 } 75

INFORMATION PROCESSING METHOD, RECORDING MEDIUM, AND INFORMATION PROCESSING DEVICE

CROSS-REFERENCE OF RELATED APPLICATIONS

This application is the U.S. National Phase under 35 U.S.C. § 371 of International Patent Application No. PCT/JP2021/002293, filed on Jan. 22, 2021, which in turn claims the benefit of Japanese Application No. 2020-031427, filed on Feb. 27, 2020, the entire disclosures of which Applications are incorporated by reference herein.

TECHNICAL FIELD

The present disclosure relates to an information processing method, a recording medium, and an information processing device.

BACKGROUND ART

There is a technique which generates logic to automatically execute the control of a device based on the control of the device and changes in the surrounding conditions of the device (see Patent Literature (PTL) 1).

CITATION LIST

Patent Literature

[PTL 1] Japanese Unexamined Patent Application Publication No. 2017-162273

SUMMARY OF INVENTION

Technical Problem

However, there is room for improvement in the registration of information for controlling a device.

Accordingly, the present disclosure provides an information processing method and the like that more appropriately register shortcuts for controlling a device.

Solution to Problem

An information processing method according to the present disclosure is an information processing method executed by a computer, and includes: obtaining first sound data from voice of a user for controlling a device; recognizing a phrase indicated by the first sound data obtained; determining first control information of the device corresponding to the phrase recognized; controlling the device according to the first control information determined; and presenting a proposal using voice when second sound data is obtained from voice of the user after the first sound data is obtained, the proposal pertaining to a shortcut for controlling the device according to the first control information.

According to this aspect, the information processing method makes a proposal pertaining to a shortcut for a voice operation performed by a user when a subsequent voice operation is performed by the user, i.e., when the user is present in a place where the user can hear the voice, and thus the user can hear the voice involved in the proposal. In other words, according to this information processing method, it is possible to avoid making the stated proposal when user U cannot hear the voice involved in the proposal. Even if user U is willing to accept the proposal, if the proposal is made when the user is not present in a place where the user can hear the voice, information indicating that the user accepts the proposal cannot be obtained, and the information processing and power consumption required for the proposal will be wasted. According to the stated information processing method, the stated wasteful information processing and power consumption can be avoided while increasing the probability that information indicating that the user accepts the proposal can be obtained. As such, according to the stated information processing method, shortcuts for controlling a device can be registered more appropriately.

Additionally, the proposal may include a registration proposal that is a proposal to newly register the shortcut, and the information processing method may further include performing the registering involved in the registration proposal when information indicating the user accepts the registration proposal is obtained.

According to this aspect, the information processing method makes it possible to avoid making a registration proposal for a shortcut when the user cannot hear the voice involved in the registration proposal. As such, according to the stated information processing method, shortcuts for controlling a device can be newly registered more appropriately.

Additionally, the information processing method may further include, when the first sound data is obtained in a state where the shortcut is registered: recognizing a phrase indicated by the second sound data obtained; determining second control information of the device corresponding to the phrase recognized; and controlling the device according to the second control information. The proposal may include a revision proposal that is a proposal to revise the shortcut registered so as to be registered as a shortcut for controlling the device according to the second control information, when a condition that the first control information and the second control information are similar is satisfied, and the information processing method may further include performing the revising involved in the revision proposal when information indicating the user accepts the revision proposal is obtained.

According to this aspect, the information processing method makes it possible to avoid making a revision proposal for a shortcut when the user cannot hear the voice involved in the revision proposal. As such, according to the stated information processing method, the registration of shortcuts for controlling a device can be revised more appropriately.

Additionally, when the second sound data is obtained in a state where the shortcut is registered, and a predetermined length of time has passed following the shortcut being registered, the proposal may include an invalidation proposal that is a proposal to invalidate the shortcut registered, and the information processing method may further include performing the invalidating involved in the invalidation proposal when information indicating the user accepts the invalidation proposal is obtained.

According to this aspect, the information processing method makes it possible to avoid making an invalidation proposal for a shortcut when the user cannot hear the voice related to the invalidation. As such, according to the stated information processing method, the registration of shortcuts for controlling a device can be invalidated more appropriately.

Additionally, the device may include a plurality of devices; the first sound data may include a plurality of instances of first sound data contained in voice uttered collectively by the user for controlling each of the plurality of devices; the first control information may be a plurality of instances of the first control information, each corresponding to respective ones of phrases recognized as indicating respective ones of the plurality of instances of first sound data; and the information processing method may further include presenting a proposal pertaining to the shortcut for collectively controlling the plurality of devices according to the plurality of instances of first control information when second sound data is obtained from voice of the user after the plurality of instances of first sound data are obtained.

According to this aspect, the information processing method makes a proposal pertaining to a shortcut related to a command by collecting device control according to each instance of voice uttered by the user in a relatively short period of time. By using shortcuts, the user has the advantage of not having to perform voice operations for each device. In addition, the information processing method executes a plurality of commands for the device based on a single shortcut phrase uttered by the user, and thus there is an advantage of reducing the information processing and power consumption required for the phrase recognition processing. As such, according to the stated information processing method, shortcuts for controlling a plurality of devices can be registered more appropriately while suppressing information processing and power consumption.

Additionally, the plurality of devices may be grouped into devices belonging to a same type, and the proposal may include a message for collectively changing a command for all the devices belonging to a same group.

According to this aspect, the information processing method makes a proposal pertaining to a shortcut for collectively controlling a plurality of devices belonging to the same type (i.e., device category), and the voice required to make the proposal can therefore be shortened. This has an advantage of reducing the information processing and power consumption for outputting the voice. As such, according to the stated information processing method, shortcuts for controlling a plurality of devices can be registered more appropriately while suppressing information processing and power consumption.

Additionally, the proposal may include information indicating a length of time of control performed according to the first control information.

According to this aspect, the information processing method makes a proposal including information indicating the time when a plurality of instances of control included in the shortcut were performed, and thus the user can know which of their voice operations the shortcut proposal has been made for upon hearing the proposal. This has an advantage of making it easier for the user to decide whether or not to accept the proposal. Furthermore, the user's acceptance is easier to obtain, and thus the information processing system can more appropriately perform the registration of more shortcuts for the control of devices.

Additionally, the proposal may not include content of the first control information.

According to this aspect, the information processing method makes a proposal that does not include the content of a plurality of instances of control that can be included in a shortcut, which makes it possible to shorten the voice involved in the proposal. This has an advantage of reducing the information processing and power consumption for outputting the voice. As such, according to the stated information processing method, a shortcut for controlling a device can be registered more appropriately while reducing information processing and power consumption.

Additionally, the second sound data may be obtained by a microphone placed in a position the voice uttered by the user can reach, the microphone being provided with a speaker within a same housing, and the proposal may be made by voice produced by the speaker.

According to this aspect, the information processing method can make a proposal to the user using a device including a microphone and a speaker in the same housing. As such, according to the stated information processing method, shortcuts for controlling a device can be registered more easily.

Additionally, the presenting of the proposal may include prohibiting the proposal when a place where the device producing the voice involved in the proposal or a time of the proposal is determined not to satisfy a predetermined condition indicating that the place or the time is appropriate for the proposal.

According to this aspect, the information processing method does not propose a shortcut at a place or a time that is not appropriate for proposals (e.g., a place or a time where the probability of obtaining acceptance is assumed to be low), which makes it possible to reduce information processing and power consumption involved in the proposal processing. As such, according to the stated information processing method, a shortcut for controlling a device can be registered more appropriately while reducing information processing and power consumption.

Additionally, a recording medium according to the present disclosure is a non-transitory computer-readable recording medium having recorded thereon a program for causing a computer to execute the above-described information processing method.

This aspect provides the same effects as the above-described information processing method.

Additionally, an information processing device according to the present disclosure includes: an obtainer that obtains first sound data from voice of a user for controlling a device; a recognizer that recognizes a phrase indicated by the first sound data obtained by the obtainer; a controller that determines first control information of the device corresponding to the phrase recognized by the recognizer, and controls the device according to the first control information determined; and a proposer that presents a proposal using voice when second sound data is obtained from voice of the user after the first sound data is obtained, the proposal pertaining to a shortcut for controlling the device according to the first control information.

This aspect provides the same effects as the above-described information processing method.

Note that these comprehensive or specific aspects may be realized by a system, a device, an integrated circuit, a computer program, or a computer-readable recording medium such as a CD-ROM, or may be implemented by any desired combination of systems, devices, integrated circuits, computer programs, and recording media.

Advantageous Effects of Invention

An information processing method of the present disclosure can more appropriately register shortcuts for controlling a device.

BRIEF DESCRIPTION OF DRAWINGS

FIG. 3 is a descriptive diagram illustrating a log of state changes caused by voice operation of a device according to the embodiment.

FIG. 4 is a descriptive diagram illustrating state change data according to the embodiment.

FIG. 5 is a descriptive diagram illustrating the content of commands from generated shortcuts according to the embodiment.

FIG. 6 is a descriptive diagram illustrating an example of a command table according to the embodiment.

FIG. 7 is a descriptive diagram illustrating the registration of a shortcut according to the embodiment.

FIG. 12 is a third descriptive diagram illustrating the revision of a shortcut according to the embodiment.

DESCRIPTION OF EMBODIMENTS

Embodiments will be described in detail hereinafter with reference to the drawings where appropriate. There are, however, cases where descriptions are omitted when further detail is not necessary. For example, detailed descriptions of matters which are already well-known, redundant descriptions of substantially identical configurations, and so on may be omitted. This is to avoid unnecessary redundancy in the descriptions and facilitate understanding for those skilled in the art.

Note that the inventor(s) have provided the accompanying drawings and the following descriptions primarily so that those skilled in the art can sufficiently understand the present disclosure, and as such the content of the scope of claims is not intended to be limited by the drawings and descriptions in any way.

Embodiment

In the following, the background to the present invention and the problems to be solved by the invention will be described in detail, followed by descriptions of an embodiment.

The present embodiment will describe an information processing method and the like that more appropriately register shortcuts for controlling a device.

Figure 1:
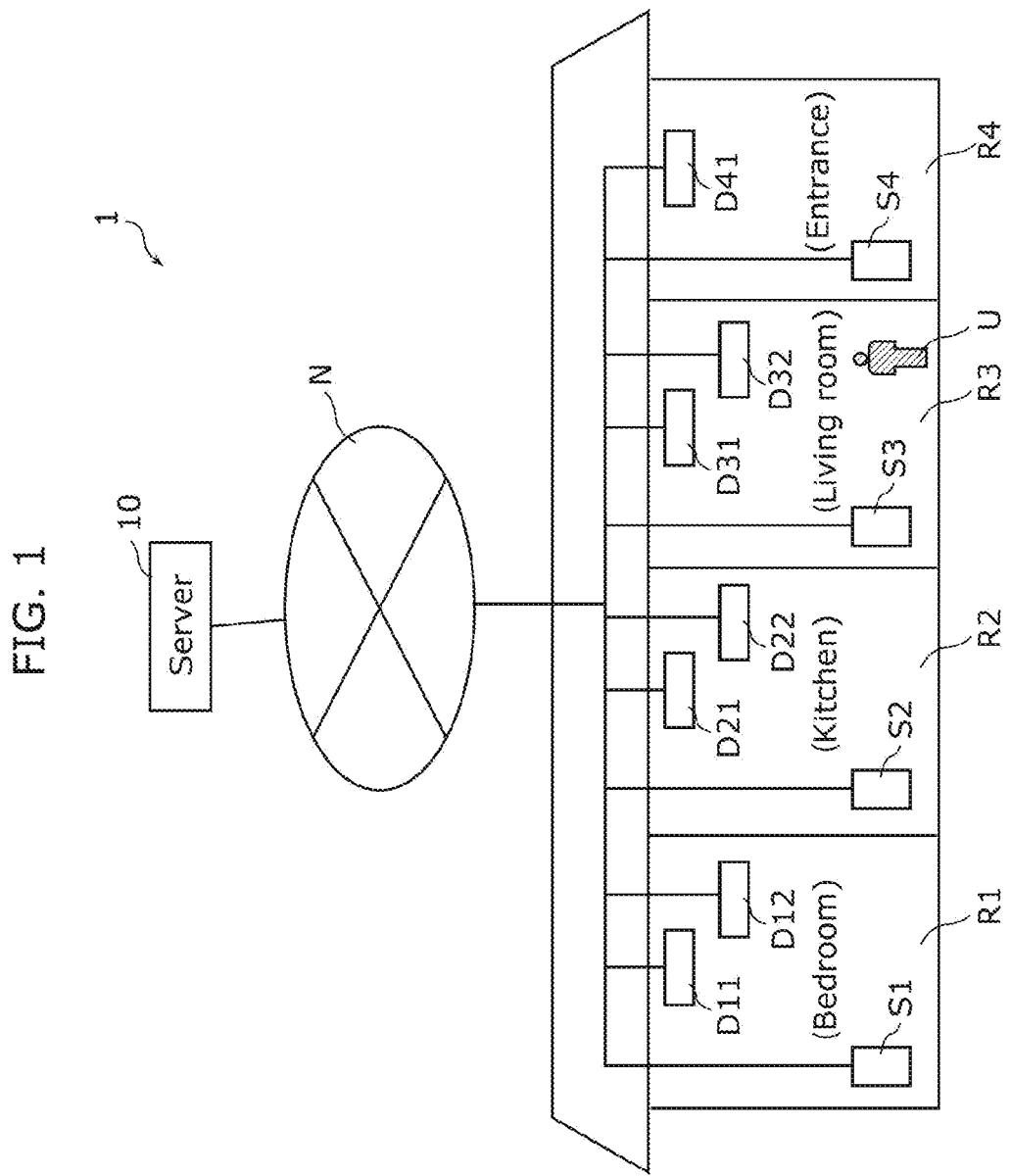
FIG. 1 is a descriptive diagram schematically illustrating the configuration of an information processing system according to an embodiment.

FIG. 1 is a descriptive diagram schematically illustrating the configuration of information processing system 1 according to the present embodiment.

Information processing system 1 illustrated in FIG. 1 is a system for controlling device D11 and the like in a residence of user U.

As illustrated in FIG. 1, information processing system 1 includes server 10 and smart speakers S1, S2, S3, and S4 (also called "S1 and the like"). Server 10 and smart speaker S1 and the like are communicably connected over network N.

Network N includes cell phone carrier networks, telephone line networks using telephone lines or optical fibers, LANs (including wired or wireless LANs), and networks in which a plurality of these networks are connected.

Server 10 is a computer device including a Central Processing Unit (CPU), memory, a communication interface, and the like. Server 10 is a device that obtains sound data indicating a user's voice from smart speaker S1 and the like over network N, and also controls device D11 and the like over network N based on the obtained sound data.

Smart speaker S1 is a speaker device including a microphone and speaker in the same housing. Smart speaker S1 can be realized by information processing performed by a CPU using memory, the microphone, the speaker, a communication interface, and the like. Smart speaker S1 is placed in a position where voice uttered by the user can reach. In other words, a smart speaker placed in a position where the voice uttered by the user can reach functions as smart speaker S1.

Smart speaker S1 collects the voice uttered by the user using the microphone, generates voice data, and transmits the generated voice data to server 10. The voice uttered by the user includes voice for controlling device D11 and the like. In addition, smart speaker S1 receives voice data indicating voice to be emitted to the user from server 10, and outputs voice indicated by the received voice data using the speaker for the user to hear. Smart speaker S1 is placed in room R1. Note that an information terminal having the same functions as smart speaker S1 described above, such as a smartphone or a tablet, can also be used instead of smart speaker S1.

Smart speakers S2, S3 and S4 are speaker devices having the same functions as smart speaker S1 and that operate independently of each other. Smart speakers S2, S3, and S4 are placed in rooms R2, R3, and R4, respectively.

An example in which the residence of user U has four rooms is described here, but the residence is not limited thereto. The four rooms R1, R2, R3, and R4 (also called "R1 and the like") of the residence of user U are, for example, a bedroom, a kitchen, a living room, and an entrance.

Rooms R1, R2, R3, and R4 contain devices D11 and D12, devices D21 and D22, devices D31 and D32, and device D41, respectively. The above devices (also called "device D11 and the like") are, for example, lighting devices, air conditioners, vacuum cleaners, washing machines, refrigerators, dishwashers, and other electrical devices that accept voice operations by user U via smart speaker S1 and the like and server 10. Each of device D11 and the like is communicably connected to server 10 over network N.

Figure 2:
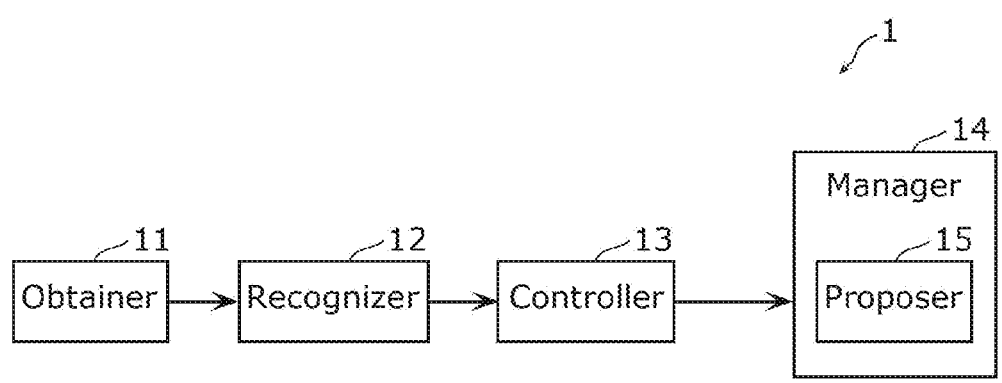
FIG. 2 is a block diagram illustrating the functional configuration of the information processing system according to the embodiment.

FIG. 2 is a block diagram illustrating the functional configuration of information processing system 1 according to the present embodiment.

As illustrated in FIG. 2, information processing system 1 includes obtainer 11, recognizer 12, controller 13, and manager 14. Each functional unit included in information processing system 1 can be realized by the CPU of server 10 or smart speaker S1 and the like executing a predetermined program using the memory.

Obtainer 11 is a functional unit that obtains sound data from the voice of user U. Obtainer 11 obtains first sound data from the voice of user U for controlling device D11 and the like. Specifically, obtainer 11 obtains sound data (corresponding to the first sound data) indicating the voice of the user, which has been generated by smart speaker S1 and the like. The user's voice contains voice uttered by the user for controlling device D11 and the like, and thus the first sound data obtained by obtainer 11 contains sound data indicating the voice of user U for controlling device D11 and the like. For example, voice uttered by the user saying "turn on the air conditioner" is an example of the voice of user U obtained by obtainer 11.

Recognizer 12 is a processing unit that recognizes a phrase indicated by the first sound data obtained by obtainer 11. Recognizer 12 recognizes the phrase indicated by the first sound data by obtaining the first sound data obtained by obtainer 11 and performing voice recognition processing on the obtained first sound data. The phrase recognized by recognizer 12 includes a name of device D11 and the like, a phrase pertaining to a command, and a shortcut phrase. A publicly-known technique can be used for the voice recognition processing. For example, when obtainer 11 has obtained voice of the user saying "turn on the air conditioner", recognizer 12 recognizes the phrase "air conditioner", which is the name of the device, and the phrase "turn on", which indicates a command to change to an ON state.

Controller 13 is a functional unit that determines control information for device D11 and the like corresponding to the phrase recognized by recognizer 12 (also called "first control information"), and controls device D11 and the like according to the determined first control information. When controller 13 controls device D11 and the like, controller 13 transmits communication packets including the control information over network N using a communication interface. For example, when obtainer 11 obtains the voice of the user saying "turn on the air conditioner", controller 13 transmits communication packets including control information that changes the air conditioner, which serves as device D11, to an ON state based on a result of recognizer 12 recognizing the phrase, and changes the air conditioner to an ON state. Additionally, when obtainer 11 obtains the voice of user U including a shortcut phrase (e.g., "I'm home"), controller 13 refers to the content of shortcut commands managed by manager 14 and transmits communication packets containing control information including commands for each device associated with the shortcut.

Manager 14 is a functional unit that manages shortcuts, which are commands for controlling device D11 and the like. The shortcut management specifically includes the generation, new registration, revision, and invalidation of shortcuts.

Manager 14 includes proposer 15, which is a functional unit that makes a proposal pertaining to a shortcut using voice. A shortcut is a command different from a command set in advance as a command for controlling device D11 and the like. Note that the shortcut is, for example, a function for controlling device D11 and the like by using a shortened version of a phrase pertaining to a command set in advance for controlling device D11 and the like. Shortcuts are also commonly called "aliases".

Proposer 15 makes a proposal to the user through voice pertaining to a shortened phrase for controlling device D11 and the like according to the first control information when second sound data is obtained by obtainer 11 from the user's voice after the point in time when the first sound data is obtained by obtainer 11. The proposal by proposer 15 is made by outputting voice involved in the proposal through smart speaker S1 and the like.

The shortened phrase may be a phrase for controlling one of device D11 and the like, or may be a phrase for controlling a plurality of devices D11 and the like.

In other words, when voice uttered by the user contains voice uttered by the user collectively for controlling each of the plurality of devices D11 and the like, information processing system 1 operates as described below. Obtainer 11 obtains a plurality of instance of first sound data contained in the voice uttered by the user collectively for controlling each of the plurality of devices D11 and the like. Recognizer 12 recognizes each of phrases indicated by the plurality of instances of the first sound data obtained by obtainer 11. Controller 13 determines control information for device D11 and the like corresponding to each of the plurality of phrases recognized by recognizer 12 (also called "first control information"), and controls device D11 and the like according to the determined control. Proposer 15 makes a proposal pertaining to one shortened phrase for controlling the plurality of devices D11 and the like collectively according to the plurality of instances of the first control information when second sound data is obtained from the user's voice after the point in time when the plurality of instances of the first sound data are obtained.

The proposal made by proposer 15 specifically includes at least a registration proposal, a revision proposal, and an invalidation proposal.

The "registration proposal" is a proposal to register a new shortened phrase. If proposer 15 has made a registration proposal, manager 14 executes registration processing involved in the registration proposal when information indicating that the user accepts the registration proposal has been obtained. When making a registration proposal, proposer 15 may inquire with the user to specify a phrase (also called a "shortcut phrase") to execute a shortcut related to registration. In this case, manager 14 registers and manages the shortcut phrase specified by the user in response to the inquiry as a phrase for executing the shortcut related to registration.

Note that the registration proposal may be made only when a condition indicating that the first control information and second control information are similar in the processing pertaining to the revision proposal, described below, is not satisfied.

The revision proposal is a proposal for a revision such that a shortened phrase already registered is registered as a shortened phrase for other control. When obtainer 11 obtains the first sound data in a state where the shortened phrase is registered, information processing system 1 operates as follows. Recognizer 12 recognizes a phrase indicated by the second sound data obtained by obtainer 11. Controller 13 determines the second control information for device D11 and the like corresponding to the phrase recognized by recognizer 12, and controls device D11 and the like according to the determined second control information. Proposer 15 makes the revision proposal, which revises the registered shortened phrase to be registered as a shortened phrase for controlling device D11 and the like according to the second control information, when a condition that the first control information and the second control information are similar is satisfied. If proposer 15 has made a revision proposal, revision processing involved in the revision proposal is executed when information indicating that the user accepts the revision proposal has been obtained.

The invalidation proposal is a proposal to invalidate a shortened phrase that is already registered. When obtainer 11 obtains the second sound data in a state where the shortened phrase is registered, and a predetermined length of time has passed following the registration of the shortened phrase, information processing system 1 operates as follows. Proposer 15 makes the invalidation proposal that invalidates the registered shortened phrase. If proposer 15 has made an invalidation proposal, invalidation processing involved in the invalidation proposal is executed when information indicating that the user accepts the invalidation proposal has been obtained.

Note that when attempting to make a proposal, proposer 15 may prohibit the proposal when a place where the device producing the voice involved in the proposal (i.e., smart speaker S1 and the like) or a time of the proposal is determined not to satisfy a predetermined condition indicating that the place or the time is appropriate for the proposal. An example of the stated predetermined condition can be that the smart speaker, which is the device that produces the voice involved in the proposal, is placed in a room aside from the entrance. In daily life, people spend only about one minute at the entrance. In this case, even if the smart speaker placed at the entrance makes a proposal, the user may not be at the entrance, in which case the user will not accept the proposal and the power required to be consumed for the processing for the proposal will be wasted. This is because it is inconvenient for the user to have to stay at the entrance until they accept the proposal.

Another example of the stated predetermined condition can be that the time for making the proposal is a time aside from the user's bedtime. This is because the user is expected to make a voice operation to turn off lighting at bedtime, but even if a proposal pertaining to a shortcut is made at that time, the user may already be asleep, in which case the user will not accept the proposal and the power required to be consumed for the processing for the proposal will be wasted. It is also inconvenient for the user because they cannot sleep until they accept the proposal, or their sleep is disturbed if the proposal is made while they are asleep.

The processing executed by each functional unit will be described in detail with reference to various types of information hereinafter.

FIG. 3 is a descriptive diagram illustrating a log of state changes caused by voice operation of device D11 and the like according to the present embodiment. The log illustrated in FIG. 3 is extracted from an operation log of device D11 and the like for which the operation state has been changed by a voice operation.

FIG. 3 includes entries 31, 32, 33, 34, 35, 36, 37, and so on as a log of state changes. One entry indicates a state change caused by a single voice operation, and contains information such as the time, device ID, pre-change state, and post-change state. One entry can be said to correspond to one voice operation. Also, entries 31 to 36 belong to operation group 41. Operation group 41 will be described later.

"Time" indicates the time when the voice operation related to the entry was performed, and more specifically, indicates the time when the control related to the voice operation related to the entry was executed.

"Device" indicates device D11 and the like for which the voice operation related to the entry was performed. It is also possible to use an identifier that can uniquely identify device D11 and the like for which the voice operation related to the entry was performed.

"Pre-change state" indicates the state of device D11 and the like before the voice operation related to the entry is performed.

"Post-change state" indicates the state of device D11 and the like after the voice operation related to the entry is performed.

For example, entry 31 illustrated in FIG. 3 indicates that at time "8:00 on Jun. 28, 2019", a voice operation was made for the device "bedroom air conditioner", which changed from an ON state (i.e., a cooling operation state), set to cooling at 23° C., to an OFF state (i.e., a stopped state).

Additionally, entry 32 illustrated in FIG. 3 indicates that at time "8:01 on Jun. 28, 2019", a voice operation was made for the device "bedroom light", which changed from an ON state (i.e., a lighted state) to an OFF state (i.e., an extinguished state).

Entries 33 to 37 are also as illustrated in FIG. 3.

Note that the voice operations related to the logs illustrated in entries 31 to 37 are examples of voice operations performed by obtainer 11, recognizer 12, and controller 13.

FIG. 4 is a descriptive diagram illustrating state change data according to the present embodiment.

The state change data illustrated in FIG. 4 is an example of data generated by manager 14 from the log of state changes illustrated in FIG. 3.

Manager 14 obtains the log of state changes illustrated in FIG. 3, and collects the voice operations corresponding to each of the entries in the log of state changes illustrated in FIG. 3 into at least one operation group by referring to the time column contained in each entry in the log of state changes. At this time, manager 14 generates an operation group for each of the entries in the log of state changes illustrated in FIG. 3, assuming that an entry at least a predetermined length of time away from the immediately-previous entry is the first voice operation included in the operation group. In other words, in the log of state changes illustrated in FIG. 3, manager 14 collects a plurality of operations into at least one operation group, using a period having a time length longer than a predetermined length of time when no voice operation is performed as a delimiter. The predetermined length of time is approximately 10 minutes, for example. In this case, entries 31-36 in FIG. 3 are grouped into operation group 41.

As illustrated in FIG. 4, the state change data is data that indicates the state change of at least one of device D11 and the like. One instance of the state change data is generated for one operation group.

More specifically, the state change data includes the state of each device immediately before the first operation included in the operation group corresponding to the state change data, and the state of each device immediately after the last operation included in the stated operation group. The data also includes the time when the last operation included in the stated operation group was performed as a "completion time".

One instance of the state change data is data indicating how the state of device D11 and the like changed immediately before and immediately after the operation group corresponding to that state change data.

For example, in the state change data illustrated in FIG. 4, the pre-change state for the air conditioner in the living room is "ON/cool/23 degrees C. (i.e., a cooling operation at a temperature setting of 23 degrees C.)", and the post-change state is "OFF". This state change corresponds to the log of entry 33 in FIG. 3.

Additionally, the pre-change state for the lighting in the living room is "ON" and the post-change state is "OFF". This state change corresponds to the log of entry 34 in FIG. 3.

Additionally, the pre-change state for the vacuum cleaner in the living room is a stopped state and the post-change state is a cleaning state. This state change corresponds to the log of entry 35 in FIG. 3.

Other state changes are also as illustrated in FIG. 4.

FIG. 5 is a descriptive diagram illustrating the content of commands from generated shortcuts according to the present embodiment. FIG. 6 is a descriptive diagram illustrating an example of a command table according to the present embodiment. FIG. 7 is a descriptive diagram illustrating the registration of a shortcut according to the present embodiment. Generation processing and registration processing of a shortcut will be described with reference to FIGS. 5, 6, and 7.

Shortcut 61 illustrated in FIG. 5 is an example of a shortcut generated from the state change data illustrated in FIG. 4. The shortcut is a collection of commands for device D11 and the like to produce the state change illustrated in FIG. 4. Here, device D11 and the like, which are to be controlled, are illustrated as being grouped by room. Shortcut 61 is also associated with a state, a phrase, and a creation date/time. The state is information about the state of shortcut 61, which can be selected from unproposed, valid, invalid, and the like. The phrase is a phrase that is used to execute the shortcut, and is also called a "shortcut phrase". The creation date/time indicates the date and time when the shortcut was created.

FIG. 6 illustrates a command table that defines control commands required to change from one state to another state for a plurality of states that device D11 and the like can take.

In the command table illustrated in FIG. 6, a control command required to transition the air conditioner in the living room from the ON state to the OFF state is defined as an OFF command. A control command required to transition the lighting in the living room from the ON state to the OFF state is defined as an OFF command. A control command required to transition the vacuum cleaner in the living room from the stopped state to the cleaning state is defined as a START command.

Manager 14 generates the shortcuts illustrated in FIG. 5 by extracting, from the command table, a command that causes device D11 and the like to undergo the state changes described in the state change data illustrated in FIG. 4.

For example, manager 14 extracts the OFF command from the command table as a command that causes state change 51, i.e., a state change that changes the air conditioner in the living room from the state "ON/cool/23 degrees C." to the state "OFF".

Additionally, manager 14 extracts the OFF command from the command table as a command that causes state change 52, i.e., a state change that changes the lighting in the living room from the state "ON" to the state "OFF".

Additionally, manager 14 extracts the START command from the command table as a command that causes state change 53, i.e., a state change that changes the vacuum cleaner in the living room from the state "stopped" to the state "cleaning".

In this manner, manager 14 generates shortcut 61 illustrated in FIG. 5 by extracting, from the command table, the command that causes the state change of each of device D11 and the like illustrated in FIG. 4.

Note that if there is no state change in each of device D11 and the like illustrated in FIG. 4 (i.e., the pre-change state and the post-change state are the same), there is no command to cause a state change. In this case, manager 14 includes, in the shortcut, information indicating that there is no corresponding command (indicated as "no command" in FIG. 5).

Manager 14 keeps the state of the generated shortcut as "unproposed" at the point in time when the shortcut is generated.

After a shortcut in the "unproposed" state in FIG. 6 is generated, proposer 15 makes a proposal to the user to register the generated shortcut as a valid (i.e. usable) shortcut (i.e., a registration proposal).

When information indicating that the user accepts the registration proposal is obtained, manager 14 registers this shortcut as a valid shortcut. Note that during the registration, manager 14 registers the shortcut phrase specified by the user in association with the shortcut (see FIG. 7).

Processing executed by information processing system 1 having the foregoing configuration will be described next. In the following, (1) processing for newly registering a shortcut, (2) processing for selectively performing new registration or revision according to the similarity of shortcuts, and (3) processing for invalidating a shortcut will be described, in that order.

(1) Processing for Newly Registering a Shortcut

Figure 8:
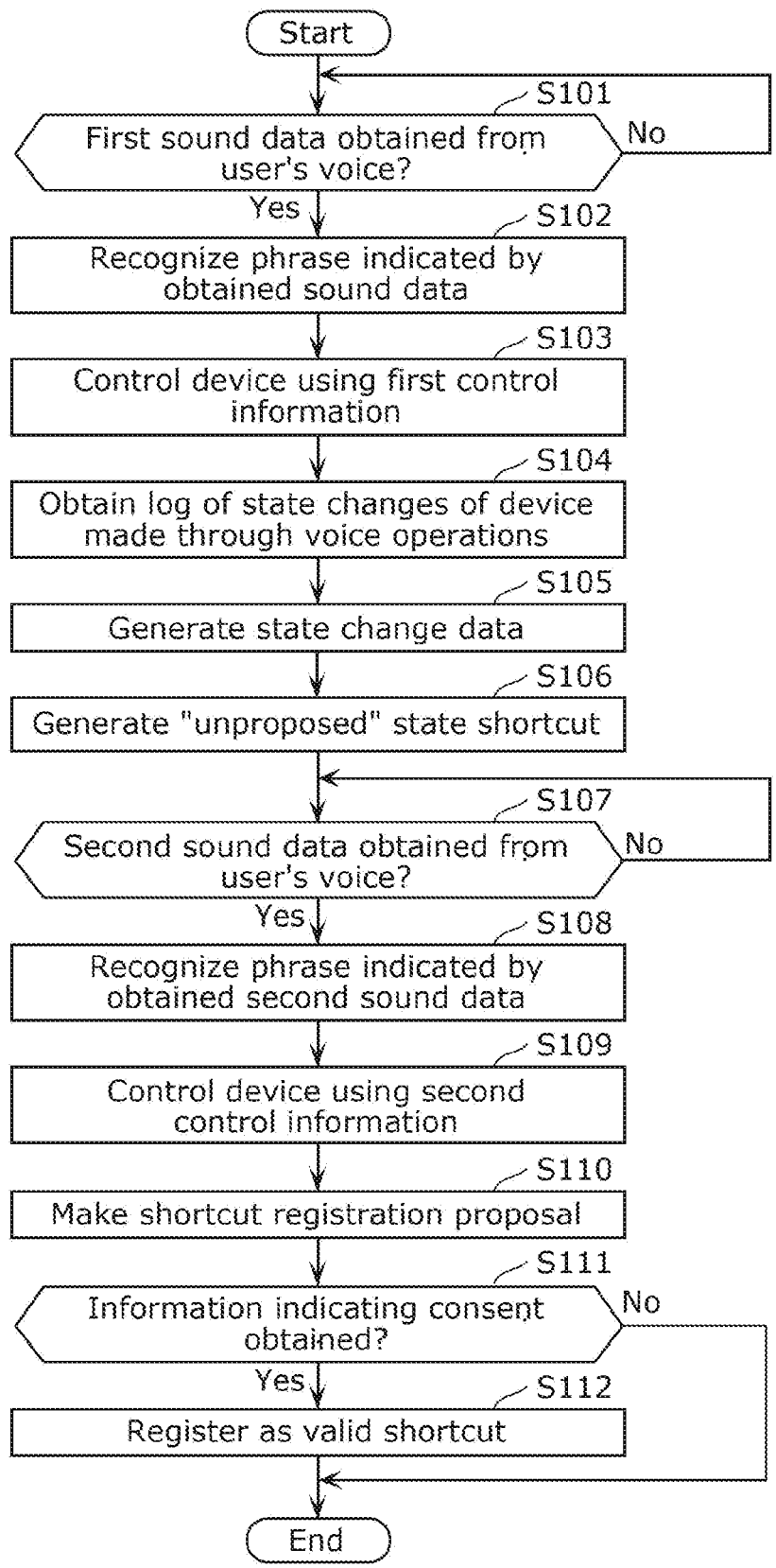
FIG. 8 is a flowchart illustrating processing of newly registering a shortcut according to the embodiment.

FIG. 8 is a flowchart illustrating processing of newly registering a shortcut according to the present embodiment.

In step S101, it is determined whether or not obtainer 11 has obtained sound data from the voice of user U for controlling device D11 and the like. If it is determined that the sound data has been obtained (Yes in step S101), the sequence moves to step S102, and if not (No in step S101), step S101 is executed again. In other words, obtainer 11 enters a standby state in step S101 until the sound data is obtained. This sound data corresponds to the first sound data.

In step S102, recognizer 12 recognizes a phrase indicated by the sound data obtained in step S101.

In step S103, controller 13 determines the first control information for device D11 and the like corresponding to the phrase recognized by recognizer 12 in step S102, and controls device D11 and the like according to the determined first control information.

In step S104, manager 14 obtains a log of state changes of device D11 and the like caused by voice operation.

In step S105, manager 14 generates the state change data based on the log of state changes obtained in step S104.

In step S106, manager 14 generates a shortcut based on the state change data generated in step S105. In this case, the state of the generated shortcut is "unproposed". The generated shortcut cannot be used in this state.

In step S107, proposer 15 determines whether or not sound data has been obtained from the voice of user U. If it is determined that the sound data has been obtained (Yes in step S107), the sequence moves to step S108, and if not (No in step S107), step S107 is executed again. In other words, proposer 15 enters a standby state in step S107 until the sound data is obtained. This sound data corresponds to the second sound data. Note that in this step, the voice of user U may or may not be voice for controlling device D11 and the like.

In step S108, recognizer 12 recognizes a phrase indicated by the second sound data obtained by obtainer 11 in step S107.

In step S109, controller 13 determines the second control information for device D11 and the like corresponding to the phrase recognized by recognizer 12 in step S108, and controls device D11 and the like according to the determined second control information.

In step S110, proposer 15 makes a registration proposal for the shortcut generated in step S106.

In step S111, manager 14 determines whether or not information indicating that user U accepts the registration proposal made in step S110 has been obtained. If the information indicating that user U accepts the proposal is obtained (Yes in step S111), the sequence moves to step S112, and if not (No in step S111), the series of processes illustrated in FIG. 8 end.

In step S112, manager 14 registers the shortcut generated in step S106 as a valid shortcut. After this, if the voice uttered by the user contains the shortcut phrase, manager 14 issues a command pertaining to the shortcut phrase to device D11 and the like.

Note that when making the shortcut registration proposal, proposer 15 makes the proposal to the user through a message such as, for example, "would you like to register the voice operation from 8 AM as a shortcut?" In this manner, proposer 15 may include information indicating the time when the control according to the first control information was performed in the proposal message. The stated message need not include the specific details of the voice operation. This is because, for example, using the message "would you like to register shortcuts for turning off the air conditioner, turning off the lights, and starting cleaning?" is complicated and the voice is long, which increases the amount of processing and power consumption of information processing system 1, and is also difficult for the user to understand.

Note also that the expression of the time "at 8:00 AM" in the stated message may be simplified if there are no other voice operations that could be the subject of the shortcut registration. For example, expressions such as "this morning" or "when you went out this morning" may be used.

Information processing system 1 proposes the new registration of a shortcut, and registers the shortcut if the proposal is accepted, through the series of processes illustrated in FIG. 8.

(2) Processing for Selectively Performing New Registration or Revision According to Similarity of Shortcuts First, the revision of a shortcut will be described. "Revising a shortcut" refers to revising the content of the commands of a shortcut which is already registered.

Figure 9:
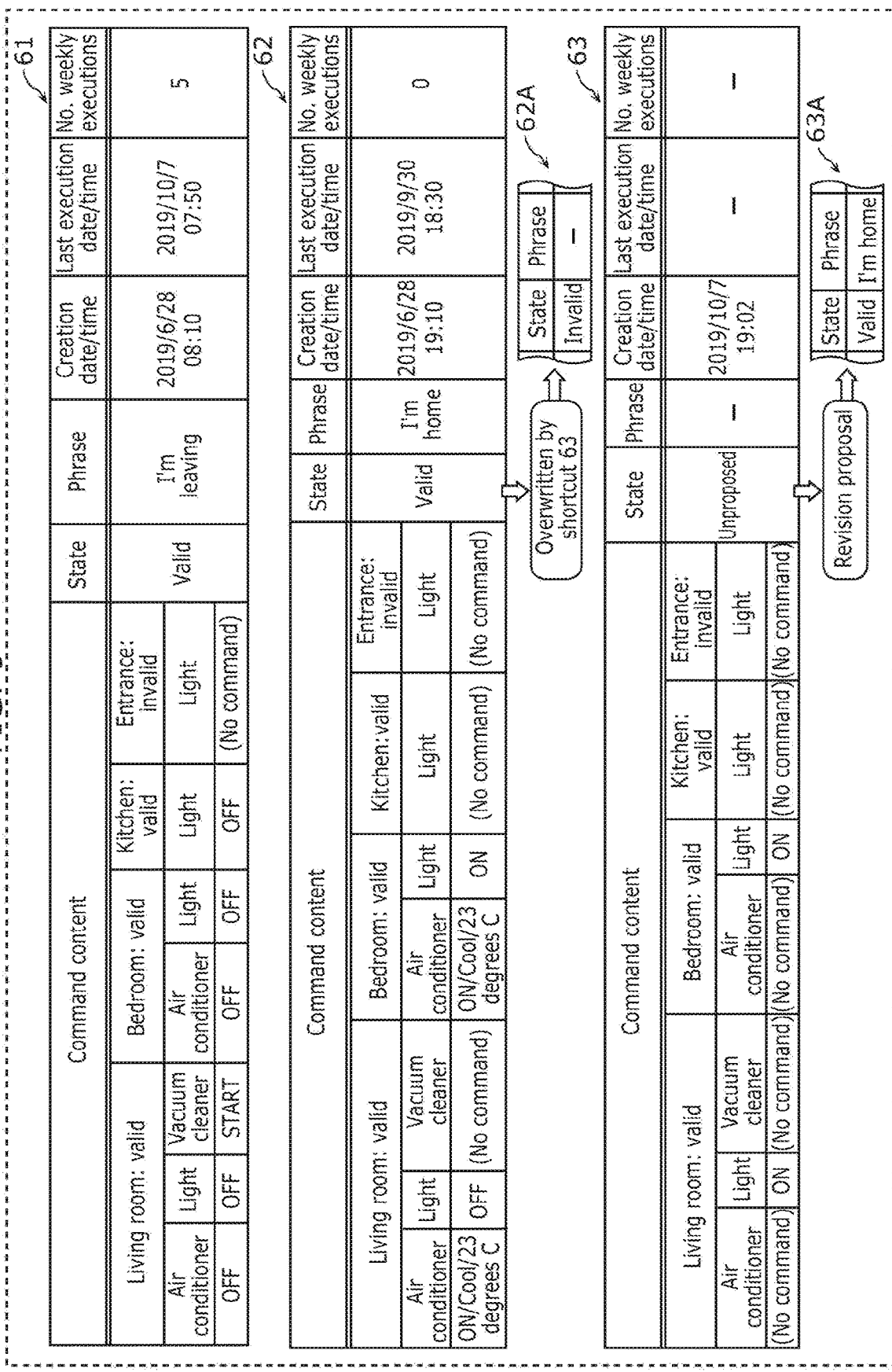
FIG. 9 is a first descriptive diagram illustrating the revision of a shortcut according to the embodiment.

FIG. 9 is a first descriptive diagram illustrating the revision of a shortcut according to the embodiment.

Shortcuts 61 and 62 illustrated in FIG. 9 have been generated through (1) above and are registered as valid shortcuts.

Shortcut 63 illustrated in FIG. 9 is a shortcut that has been generated through (1) above and is in an unproposed state (the state after step S106).

Here, the time at which shortcut 62 was generated is 19:10 and the time at which shortcut 63 was generated is 19:02, which are differences only in the range of a few minutes, at most. As such, it may be more convenient for the user to register the contents of shortcut 63 as a revision of shortcut 62 that is already registered as a valid shortcut, i.e., as a shortcut using the phrase of shortcut 62.

An example of the result of a revision when registered as a revision is indicated as column 62A and column 63A in FIG. 9.

Shortcut 62 is revised to shortcut 63 by the revision, and thus the state becomes "invalid" and the shortcut phrase is deleted (see column 62A).

In addition, shortcut 63 is registered as a valid shortcut, and the phrase "I'm home", which was registered as the phrase of shortcut 62, is registered as the phrase of shortcut 63 (see column 63A).

A method that makes it possible to propose the revision of a shortcut instead of newly registering a new shortcut in this manner will be described here.

Figure 10:
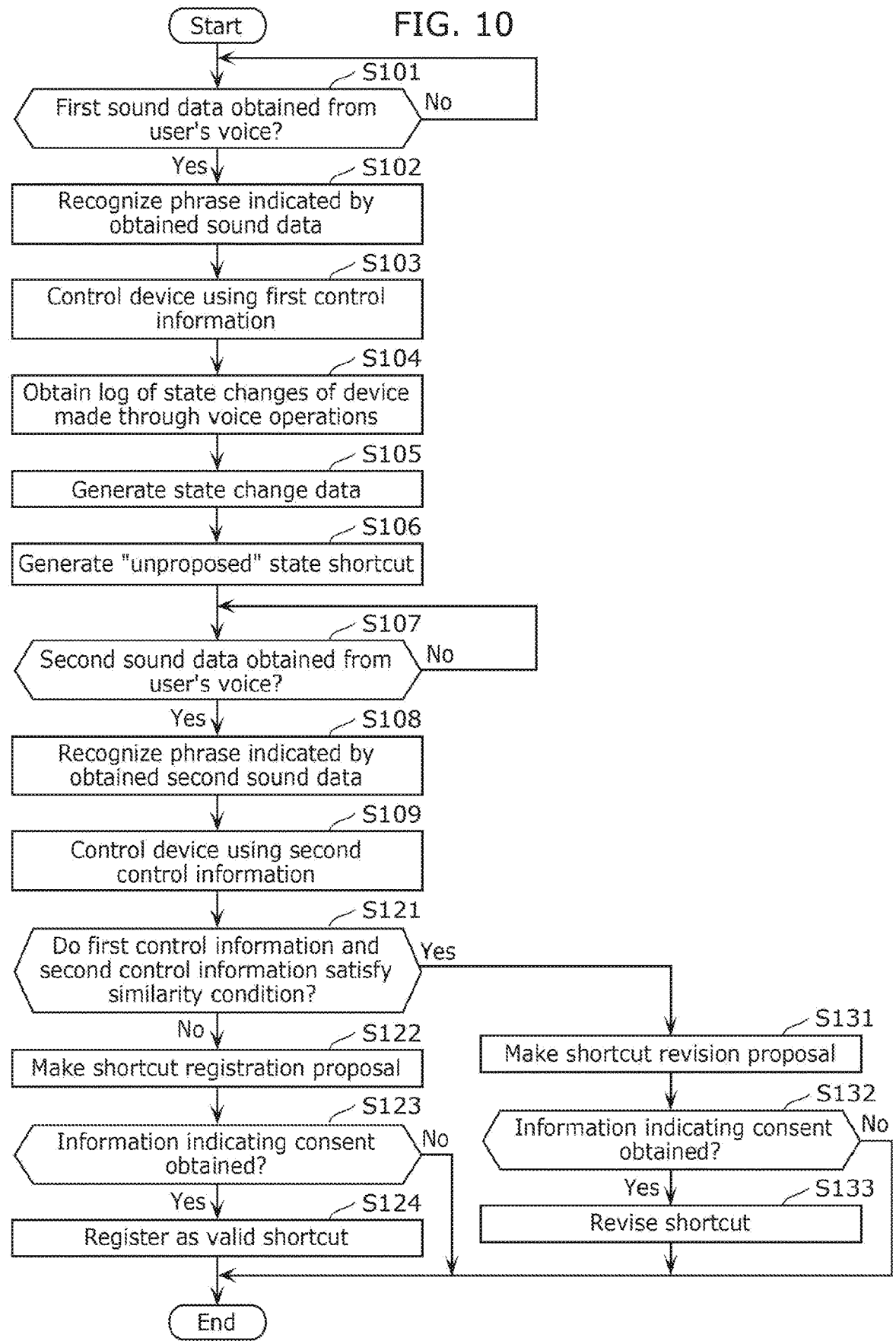
FIG. 10 is a flowchart illustrating processing of selectively performing the new registration and the revision of a shortcut according to the embodiment.

FIG. 10 is a flowchart illustrating processing of selectively performing the new registration and the revision of a shortcut according to the present embodiment. FIG. 10 is assumed to be executed in a state where at least one shortcut is already registered. The at least one shortcut that is already registered corresponds to shortcuts 61 and 62 illustrated in FIG. 9.

The processing from step S101 to step S109 illustrated in FIG. 10 is the same as the processing indicated by the same signs in FIG. 8. The shortcut in the "unproposed" state generated in step S106 corresponds to shortcut 63 illustrated in FIG. 9.

In step S121, proposer 15 determines whether or not a condition indicating that the first control information and the second control information are similar is satisfied. If it is determined that the condition is satisfied (Yes in step S121), the sequence moves to step S131, and if not (No in step S121), the sequence moves to step S122. When there are a plurality of instances of the first control information, it is determined whether or not the stated condition is satisfied with the second control information for each of the plurality of instances of the first control information.

In step S122 to step S124, manager 14 makes a registration proposal for the shortcut generated in step S106 in the same manner as in steps S110 to S112 illustrated in FIG. 8, and registers the shortcut as a valid shortcut when the user accepts the registration proposal.

In step S131, proposer 15 makes a revision proposal for the shortcut generated in step S106.

In step S132, manager 14 determines whether or not information indicating that user U accepts the revision proposal made in step S131 has been obtained. If the information indicating that user U accepts the proposal is obtained (Yes in step S132), the sequence moves to step S133, and if not (No in step S132), the series of processes illustrated in FIG. 10 end.

If information indicating that user U accepts the proposal cannot be obtained in step S132 (No in step S132), a new shortcut may be proposed (step S122). This makes it possible to distinguish between similar shortcuts and register the shortcuts.

In step S133, manager 14 revises the first control information, which has been determined to be similar to the second control information in step S121, to the shortcut generated in step S106. At this time, the shortcut phrase from before the revision is used as-is as the shortcut phrase. After this, if the voice uttered by the user contains the shortcut phrase, manager 14 issues a command pertaining to the shortcut phrase to device D11 and the like.

Note that information processing system 1 may output a message indicating the revision content as voice when making the revision proposal. For example, when revising shortcut 62 illustrated in FIG. 9 to shortcut 63, a message such as "of the 'I'm home' shortcuts, would you like to invalidate the command for the living room air conditioner and invalidate the command for the bedroom air conditioner?" may be output as voice. By doing so, the user has the advantage of knowing the specific details of the revision.

Note that it may be possible to shorten the length of the message of a revision proposal by modifying the shortcut generation process. In FIG. 5, device D11 and the like are illustrated as being grouped by room, but device D11 and the like are grouped by type, the shortcuts are expressed as illustrated in FIG. 11.

Figure 11:
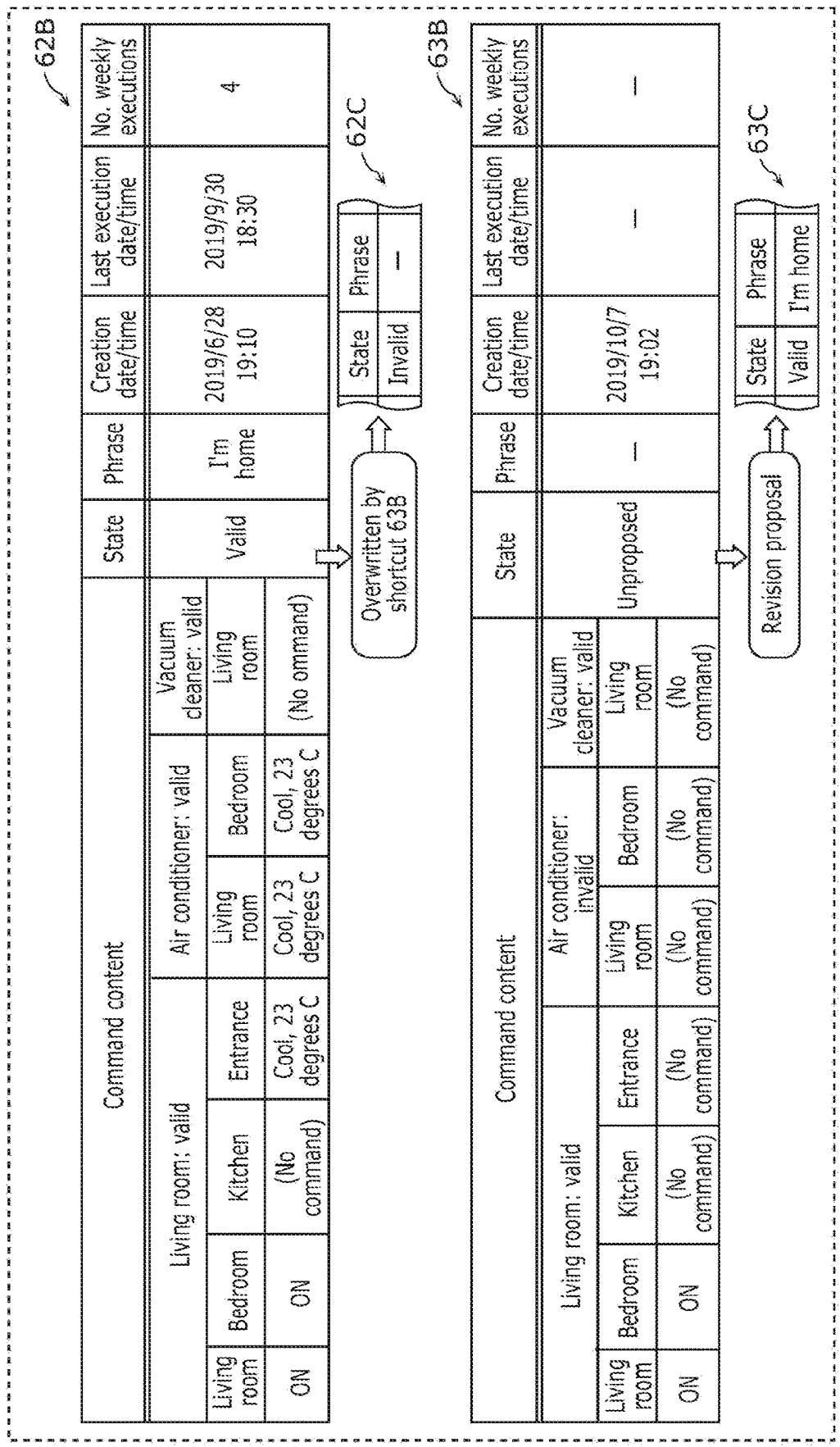
FIG. 11 is a second descriptive diagram illustrating the revision of a shortcut according to the embodiment.

FIG. 11 is a second descriptive diagram illustrating the revision of a shortcut according to the present embodiment.

Shortcuts 62B and 63B illustrated in FIG. 11 express shortcuts 62 and 63 illustrated in FIG. 9, respectively, for each type of device. This expression can also be said to be an expression of the plurality of devices D11 and the like grouped by devices belonging to the same type.

In this case, proposer 15 may make a proposal including a message for collectively changing a command for all the devices belonging to the same group.

If shortcuts are expressed for each type of device, revising shortcut 62B to shortcut 63B corresponds to invalidating the commands for all air conditioners.

Accordingly, proposer 15 can use a message saying "would you like to invalidate all air conditioner commands among the shortcuts for 'I'm home'?" when making the revision proposal. Doing so makes it possible to shorten the message involved in the proposal, which makes it possible to reduce the information processing and power consumption of information processing system 1, and at the same time makes the proposal easier for the user to understand.

Note that the result of the revision when registering as a revision is the same as in FIG. 9 (see column 62C and column 63C in FIG. 11).

In addition, when making the revision proposal, the shortcut may be revised to include a command made at a time relatively close to the execution of the shortcut, along with the registered shortcut.

FIG. 12 is a third descriptive diagram illustrating the revision of a shortcut according to the present embodiment. FIG. 12 illustrates a log of shortcut executions and state changes caused by voice operation of device D11 and the like.

FIG. 12 includes entry 71, which is a log of the execution of shortcut 62, and entries 72, 73, and so on, which are logs of state changes.

Entry 71 illustrated in FIG. 12 indicates that shortcut 62 was executed at the time "Oct. 7, 2019, 7:00 PM". Additionally, the voice operations indicated in entries 72 and 73 are illustrated as having been made at times "Oct. 7, 2019, 7:00 PM" and "Oct. 7, 2019, 7:02 PM", respectively.

Manager 14 collects the shortcut executions and voice operations illustrated in FIG. 12 into at least one operation group, in the same manner as illustrated in FIG. 3. At this time, manager 14 generates an operation group assuming that an entry at least a predetermined length of time away from the immediately-previous entry is the first voice operation included in the operation group. This makes it possible to collect entries 71 to 73 in operation group 75.

In this case, manager 14 makes a proposal to revise shortcut 62 into shortcut 63 by adding the voice operations illustrated in the logs of entries 72 and 73 to the command contained in shortcut 62.

In this manner, manager 14 can revise the content of shortcut 62.

(3) Processing for Invalidating a Shortcut

First, the invalidation of a shortcut will be described. "Invalidating a shortcut" refers to putting an already-registered shortcut into an unusable state (i.e., not valid). Invalidating a shortcut includes deleting the registration of the shortcut, or keeping the shortcut in an unusable state.

As one example, invalidating a shortcut is done when the usage frequency of a registered shortcut falls below a predetermined frequency. The predetermined frequency is, for example, approximately once or twice a week, or zero times a week.

Figure 13:
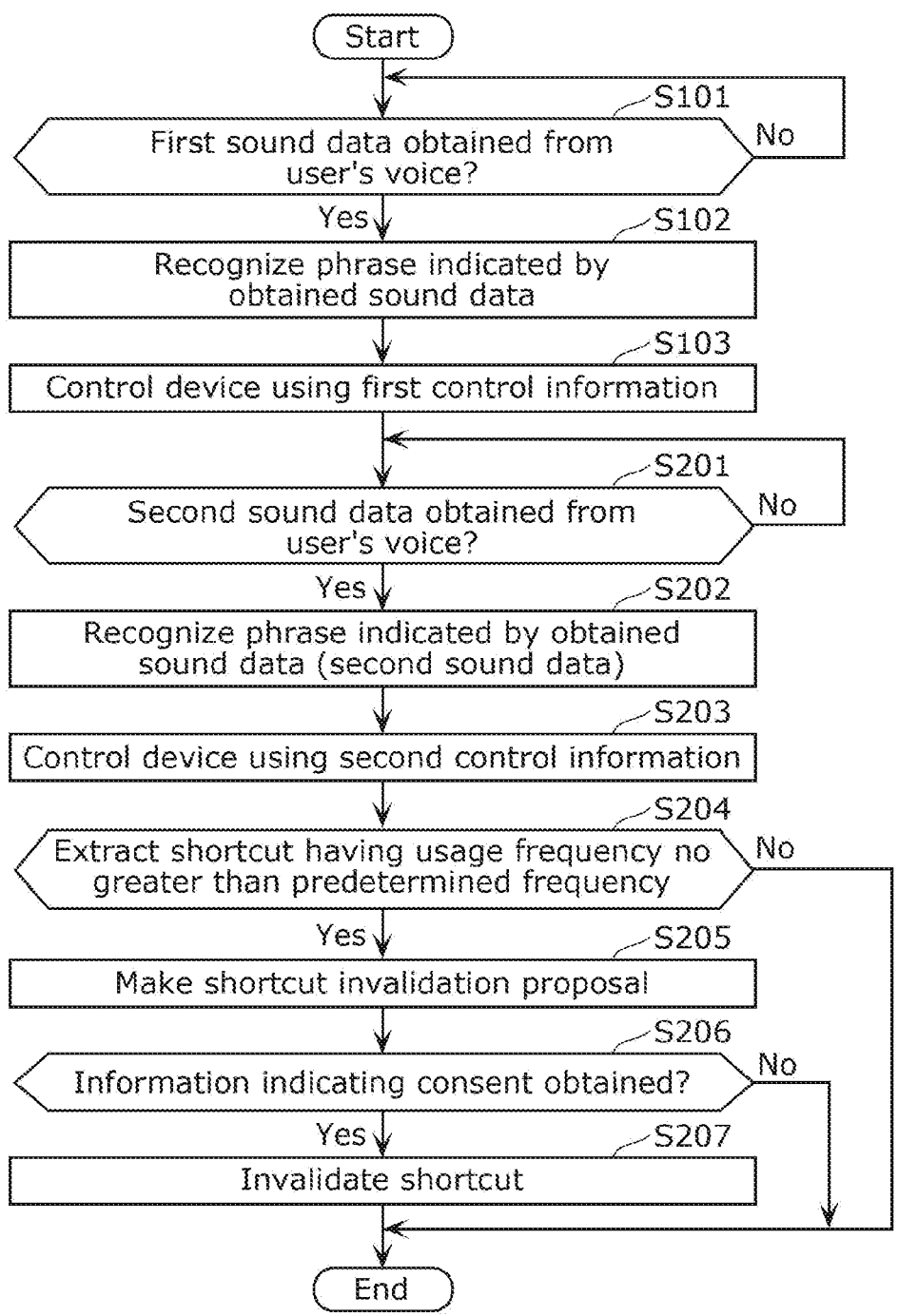
FIG. 13 is a flowchart illustrating processing of invalidating a shortcut according to the embodiment.

FIG. 13 is a flowchart illustrating processing of invalidating a shortcut according to the present embodiment.

Steps S101 to S103 are the same as the steps having the same signs in FIG. 8.

In step S201, proposer 15 determines whether or not voice of user U has been obtained. If it is determined that voice of user U has been obtained (Yes in step S201), the sequence moves to step S202, and if not (No in step S201), step S201 is executed again. In other words, proposer 15 enters a standby state in step S201 until voice of user U is obtained. Note that in this step, the voice of user U may or may not be voice for controlling device D11 and the like. If a proposal for invalidating is to be executed regardless of whether or not the voice of user U is for controlling device D11 and the like, it is not necessary to execute the subsequent steps S202 and S203.

In step S202, recognizer 12 recognizes a phrase indicated by the second sound data obtained by obtainer 11 in step S201.

In step S203, controller 13 determines the second control information for device D11 and the like corresponding to the phrase recognized by recognizer 12 in step S202, and controls device D11 and the like according to the determined second control information.

In step S204, manager 14 extracts a shortcut, among the shortcuts already registered, which has a usage frequency no greater than the predetermined frequency.

In step S205, proposer 15 makes an invalidation proposal for the shortcut extracted by manager 14 in step S204.

In step S206, manager 14 determines whether or not information indicating that user U accepts the invalidation proposal made in step S205 has been obtained. If the information indicating that user U accepts the proposal is obtained (Yes in step S206), the sequence moves to step S207, and if not (No in step S206), the series of processes illustrated in FIG. 13 end.

In step S207, manager 14 invalidates the shortcut for which the information indicating acceptance was obtained in step S206.

Hereinafter, the flow of shortcut proposals by information processing system 1 according to the present embodiment will be described with comparison to an information processing systems according to a related technique.

Figure 14:
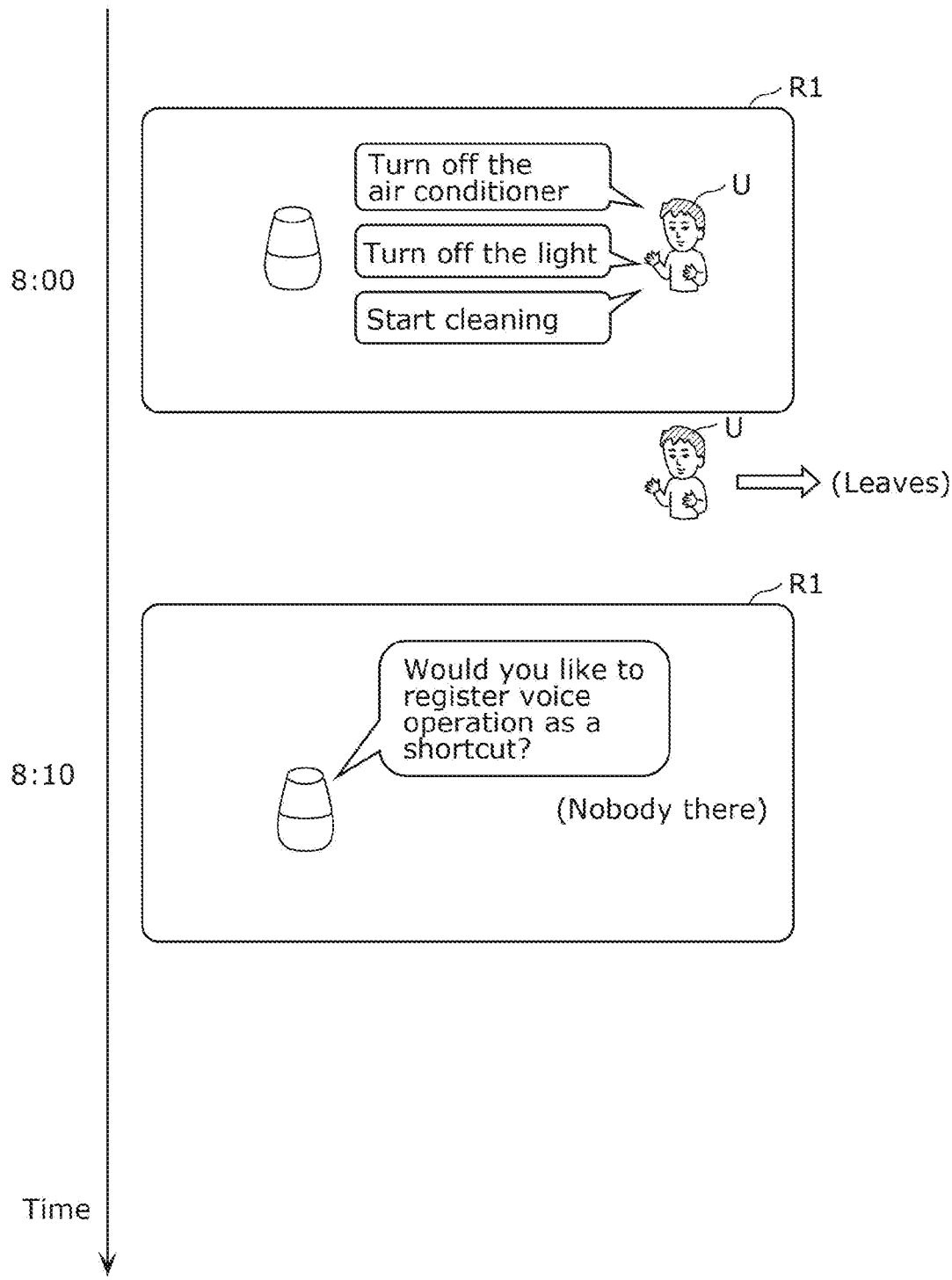
FIG. 14 is a descriptive diagram illustrating processing of registering a shortcut according to a related technique.

FIG. 14 is a descriptive diagram illustrating the proposal of a shortcut by an information processing system according to a related technique.

FIG. 14 illustrates user U controlling a device using a smart speaker in room R1. The smart speaker is connected to a server (not shown) over a network (not shown). The server has a function for making proposals for shortcuts that collect a plurality of voice operations made in a relatively short period of time by using the smart speaker 10 minutes after the plurality of voice operations are made.

It is assumed that at 8:00 AM, the user, in preparation for going out, utters voice saying "turn off the air conditioner" as a voice operation for turning off an air conditioner, voice saying "turn off the light" as a voice operation for turning off a light, and voice saying "start cleaning" as a voice operation for starting cleaning with a vacuum cleaner.

The user goes out after producing the stated voice, and there is no longer anyone in room R1. The information processing system executes control to turn off the air conditioner, turn off the light, and start cleaning with the vacuum cleaner based on the stated voice.

At 8:10 AM, the smart speaker makes a registration proposal for a shortcut that collects these voice operations. This corresponds to approximately 10 minutes after the plurality of voice operations were made.

However, user U is not in room R1 when the registration proposal for the shortcut is made. Therefore, no response to the registration proposal will be obtained. As a result, the user does not make a response indicating acceptance, and thus the shortcut is not registered.

Figure 15:
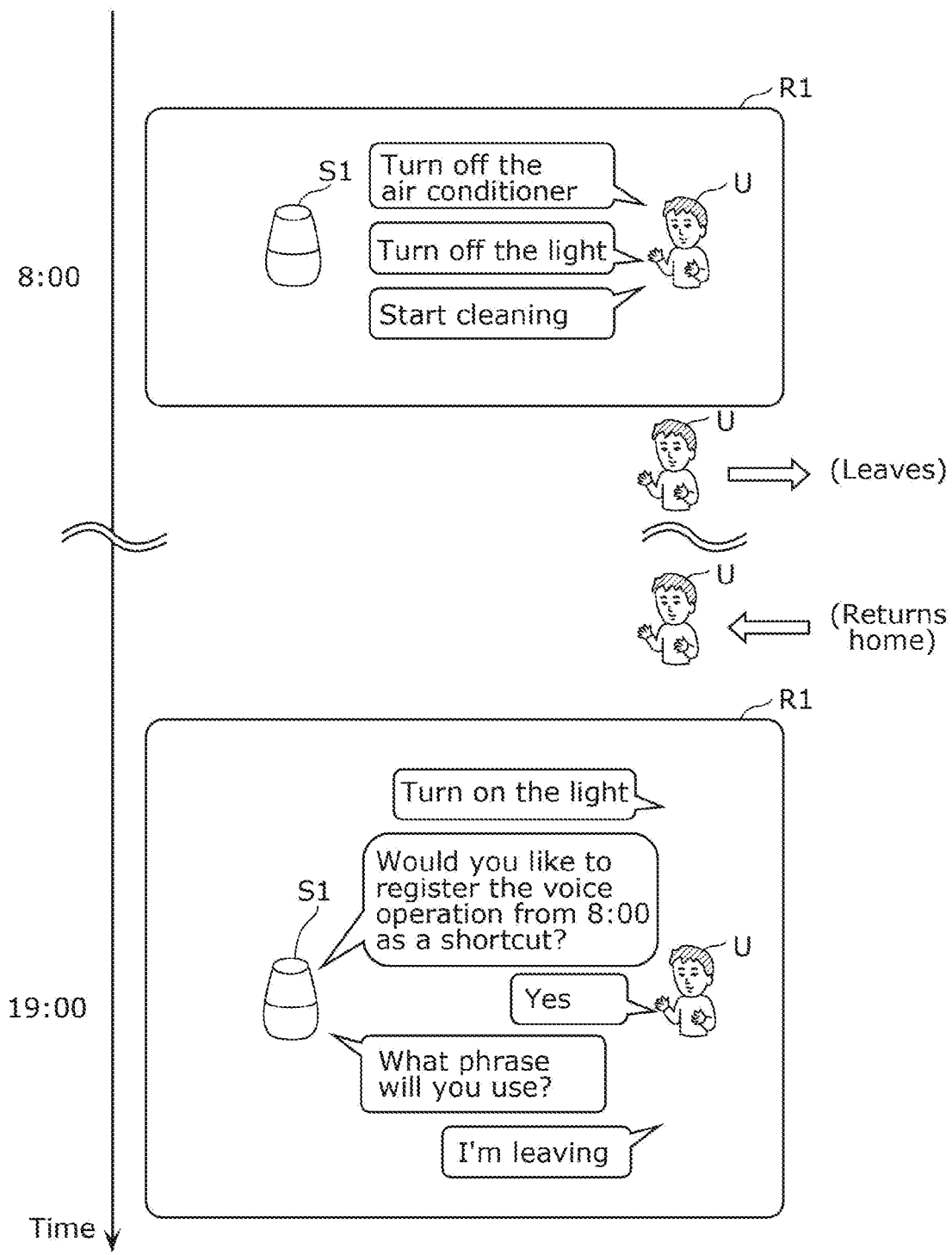
FIG. 15 is a descriptive diagram illustrating processing of registering a shortcut according to the embodiment.

FIG. 15 is a descriptive diagram illustrating the proposal of a shortcut by information processing system 1 according to the present embodiment.

Like the case illustrated in FIG. 14, assume that user U utters voice for voice operations for turning off the air conditioner, turning off the light, and starting to clean using the vacuum cleaner at 8:00 AM. After that, user U goes out, and there is no longer anyone in room R1. Information processing system 1 executes control to turn off the air conditioner, turn off the light, and start cleaning with the vacuum cleaner based on the stated voice (steps S101 to S103 in FIG. 8).

At 7:00 PM, user U returns home.

Assume that user U, after returning home, utters voice saying "turn on the light" as a voice operation for turning on the light. Information processing system 1 executes control for turning the light on based on the stated voice (steps S108 to 109).

In addition, a registration proposal is made for a shortcut that collects the voice operations performed around 8:00 AM, and the shortcut is registered after the user accepts the proposal (steps S110 to S112).

In this manner, with information processing system 1 according to the present embodiment, a proposal pertaining to a shortcut for a voice operation performed by user U is made when a subsequent voice operation is performed by user U, and thus user U can hear the voice involved in the proposal. In other words, information processing system 1 can avoid a situation in which the voice of the proposal pertaining to a voice operation is produced while user U is not in room R1 and a response to the registration proposal therefore cannot be obtained. In this manner, information processing system 1 can effectively make proposals pertaining to shortcuts.

Variation on Embodiment

Figure 16:
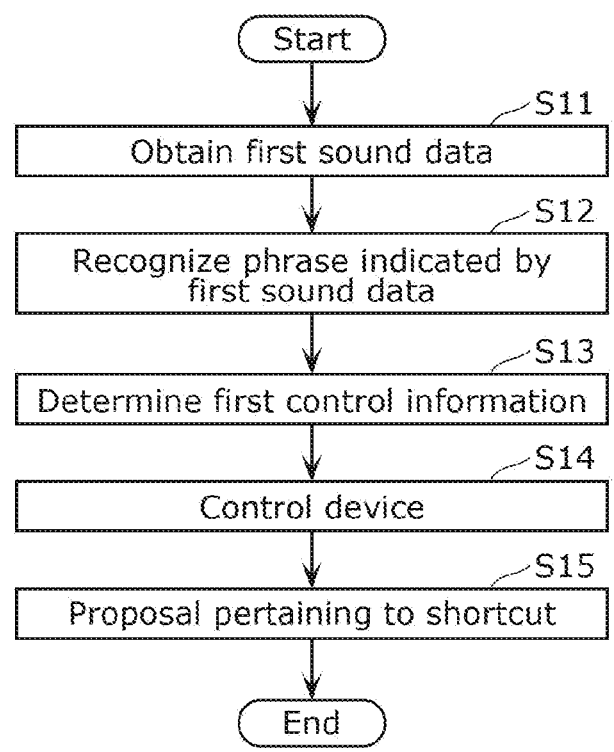
FIG. 16 is a flowchart illustrating an information processing method according to a variation on the embodiment.

FIG. 16 is a flowchart illustrating an information processing method according to the present variation.

In step S11, first sound data is obtained from voice of a user for controlling a device.

In step S12, the phrase indicated by the obtained first sound data is recognized.

In step S13, first control information of the device corresponding to the recognized phrase is determined.

In step S14, the device is controlled according to the determined first control information.

In step S15, voice is used to make a proposal pertaining to a shortcut for controlling the device according to the first control information when second sound data is obtained from voice of the user after obtaining the first sound data.

The series of processes illustrated in FIG. 16 more appropriately execute the registration of shortcuts for the control of a device.

The foregoing embodiments have been described as examples of the technique according to the present disclosure. The accompanying drawings and detailed descriptions have been provided to that end.

As such, the constituent elements indicated in the accompanying drawings and the detailed descriptions include not only constituent elements necessary to solve the technical problem, but also constituent elements not necessary to solve the problem but used to exemplify the above-described technique. Those unnecessary constituent elements being included in the accompanying drawings, the detailed description, and so on should therefore not be interpreted as meaning that the unnecessary constituent elements are in fact necessary.

Additionally, the foregoing embodiments are provided merely as examples of the technique according to the present disclosure, and thus many changes, substitutions, additions, omissions, and the like are possible within the scope of the claims or a scope equivalent thereto.

INDUSTRIAL APPLICABILITY

The present disclosure can be applied in information processing systems and the like that control devices.

REFERENCE SIGNS LIST

1 Information processing system
10 Server
11 Obtainer
12 Recognizer
13 Controller
14 Manager
15 Proposer
31, 32, 33, 34, 35, 36, 37, 71, 72, 73 Entry
41, 75 Operation group
51, 52, 53 State change
61, 62, 62B, 63, 63B Shortcut
62A, 62C, 63A, 63C Column
D11, D12, D21, D22, D31, D32, D41 Device
N Network
R1, R2, R3, R4 Room
S1, S2, S3, S4 Smart speaker
U User

The invention claimed is:

1. An information processing method executed by a computer, the information processing method comprising:
obtaining first sound data from voice of a user for controlling each of a plurality of devices, the first sound data including a plurality of instances of first sound data contained in voice uttered collectively by the user for controlling each of the plurality of devices;
recognizing a phrase indicated by the first sound data obtained;
determining first control information of each of the plurality of devices corresponding to the phrase recognized, the first control information comprising a plurality of instances of the first control information, each corresponding to respective ones of phrases recognized as indicating respective ones of the plurality of instances of first sound data;
controlling each of the plurality of devices according to the first control information determined;
storing a history of controls of each of the plurality of devices, in which time information of control, identification information, status change information of the plurality of devices are associated with each other as entries;
determining whether second sound data is obtained from voice of the user after the plurality of instances of first sound data are obtained and after each of the plurality of devices is controlled according to the first control information, the second sound data not being the first sound data repeatedly uttered by the user;

generating a proposal pertaining to a shortcut for collectively controlling the plurality of devices, according to the history, the shortcut comprising one or more controls generated based on one or more entries selected from the history based on the time information;

presenting the proposal using voice when the second sound data is determined to be obtained;

when the first sound data is obtained in a state where the shortcut is registered, recognizing a phrase indicated by the second sound data obtained;

determining second control information of each of the plurality of devices corresponding to the phrase recognized and indicated by the second sound data;

controlling each of the plurality of devices according to the second control information determined;

determining whether or not a condition indicating that the first control information and the second control information are similar is satisfied;

making a revision proposal to revise the shortcut registered to be a shortcut for controlling each of the plurality of devices according to the second control information when the condition is determined to be satisfied; and performing the revising involved in the revision proposal when information indicating the user accepts the revision proposal is obtained, wherein when the revision proposal is made to revise the shortcut, the shortcut is revised to include a command made at a time closer to execution of the shortcut than one time is, the command being included in a plurality of commands made, the one time is a time at which, among the plurality of commands, a subsequent command is made, the subsequent command being made after a predetermined time length from the execution of the shortcut is made, and when the second sound data is obtained in a state where the shortcut is registered, and a predetermined length of time has passed following the shortcut being registered, the proposal includes an invalidation proposal that is a proposal to invalidate the shortcut registered, and the information processing method further comprises performing the invalidating involved in the invalidation proposal when information indicating the user accepts the invalidation proposal is obtained.

2. The information processing method according to claim 1, wherein the proposal includes a registration proposal that is a proposal to newly register the shortcut, and the information processing method further comprises performing the registering involved in the registration proposal when information indicating the user accepts the registration proposal is obtained.

3. The information processing method according to claim 1, wherein the plurality of devices are grouped into devices belonging to a same type, and the proposal includes a message for collectively changing a command for all the devices belonging to a same group.

4. The information processing method according to claim 1, wherein the proposal includes information indicating a length of time of control performed according to the first control information.

5. The information processing method according to claim 1, wherein the proposal does not include content of the first control information.

6. The information processing method according to claim 1, wherein the second sound data is obtained by a microphone placed in a position the voice uttered by the user can reach, the microphone being provided with a speaker within a same housing, and the proposal is made by voice produced by the speaker.

7. The information processing method according to claim 1, wherein the presenting of the proposal includes prohibiting the proposal when a place where one of the plurality of devices producing the voice involved in the proposal or a time of the proposal is determined not to satisfy a predetermined condition indicating that the place or the time is appropriate for the proposal.

8. A non-transitory computer-readable recording medium having recorded thereon a program for causing a computer to execute the information processing method according to claim 1.

9. The information processing method according to claim 1, wherein the phrase indicated by the second sound data is different from the phrase indicated by the first sound data.

10. The information processing method according to claim 1, wherein the plurality of device are disposed in different rooms.

11. An information processing device comprising:

a central processing unit (CPU); and a memory storing a program, wherein the program, when executed by the CPU, causes the CPU to perform:

obtaining first sound data from voice of a user for controlling each of a plurality of devices, the first sound data including a plurality of instances of first sound data contained in voice uttered collectively by the user for controlling each of the plurality of devices;

recognizing a phrase indicated by the first sound data obtained;

determining first control information of each of the plurality of devices corresponding to the phrase recognized, the first control information comprising a plurality of instances of the first control information, each corresponding to respective ones of phrases recognized as indicating respective ones of the plurality of instances of first sound data;

controlling each of the plurality of devices according to the first control information determined;

storing a history of controls of each of the plurality of devices, in which time information of control, identification information, status change information of the plurality of devices are associated with each other as entries;

determining whether second sound data is obtained from voice of the user after the plurality of instances of first sound data are obtained and after each of the plurality of devices is controlled according to the first control information, the second sound data not being the first sound data repeatedly uttered by the user;

generating a proposal pertaining to a shortcut for collectively controlling the plurality of devices, according to the history, the shortcut comprising one or more controls generated based on one or more entries selected from the history based on the time information;

presenting the proposal using voice when the second sound data is determined to be obtained;

when the first sound data is obtained in a state where the shortcut is registered, recognizing a phrase indicated by the second sound data obtained;

determining second control information of each of the plurality of devices corresponding to the phrase recognized and indicated by the second sound data;

controlling each of the plurality of devices according to the second control information determined;

determining whether or not a condition indicating that the first control information and the second control information are similar is satisfied;

making a revision proposal to revise the shortcut registered to be a shortcut for controlling the device according to the second control information when the condition is determined to be satisfied; and performing the revising involved in the revision proposal when information indicating the user accepts the revision proposal is obtained, and when the revision proposal is made to revise the shortcut, the shortcut is revised to include a command made at a time closer to execution of the shortcut than one time is, the command being included in a plurality of commands made, the one time is a time at which, among the plurality of commands, a subsequent command is made, the subsequent command being made after a predetermined time length from the execution of the shortcut is made, and when the second sound data is obtained in a state where the shortcut is registered, and a predetermined length of time has passed following the shortcut being registered, the proposal includes an invalidation proposal that is a proposal to invalidate the shortcut registered, and the CPU further performs the invalidating involved in the invalidation proposal when information indicating the user accepts the invalidation proposal is obtained.

* * * * *